(No Model.) 2 Sheets—Sheet 1.
W. F. DUNCKER.
INTESTINE CLEANER.
No. 525,455. Patented Sept. 4, 1894.
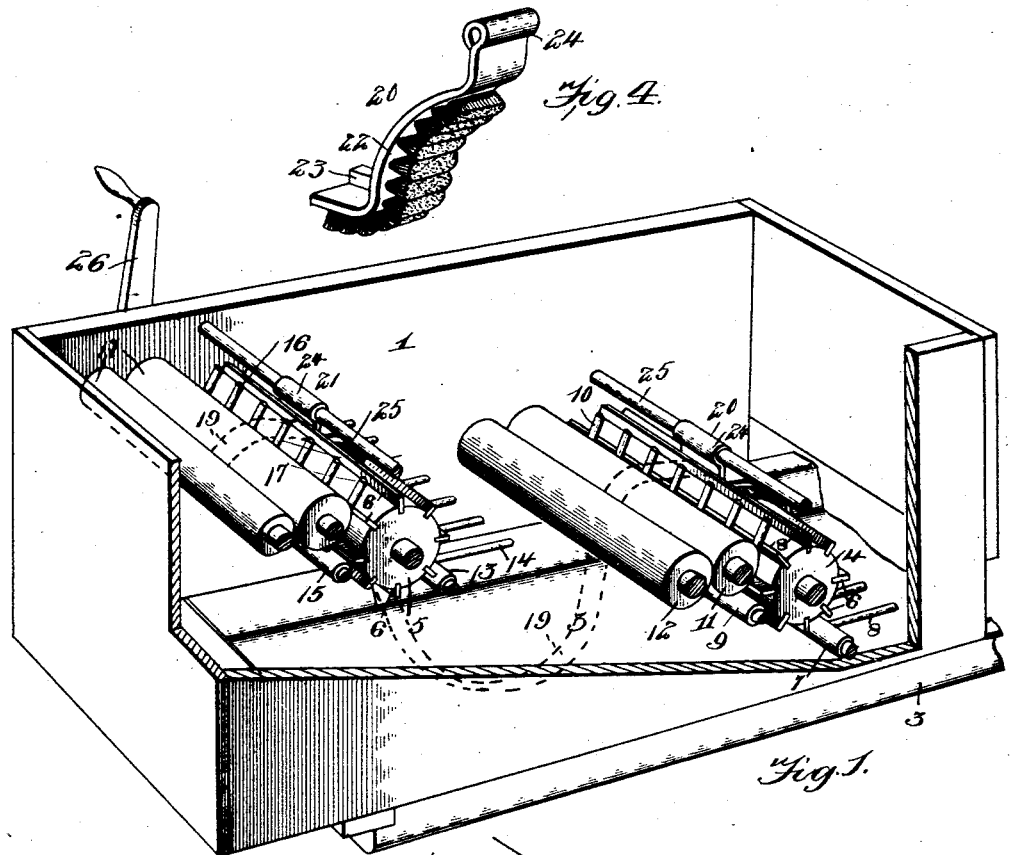
Fig. 4.
Fig. 1.
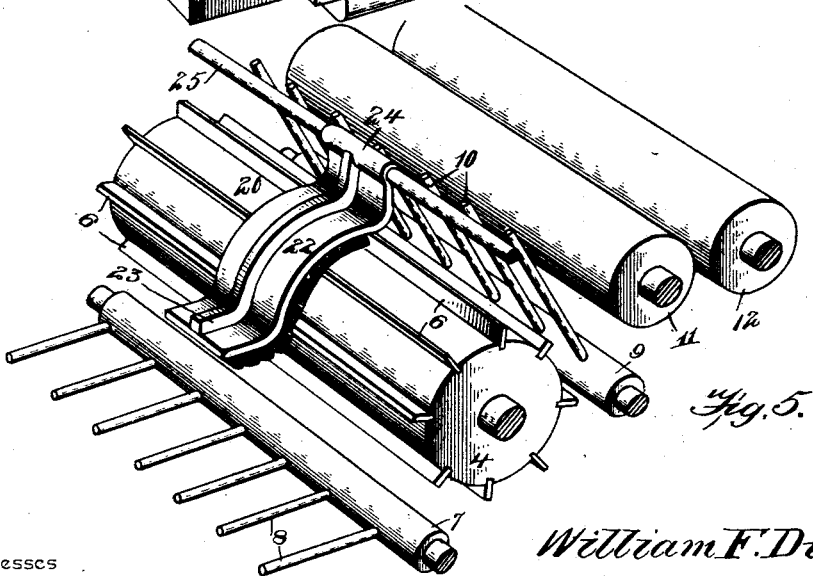
Fig. 5.
Witnesses
Inventor
William F. Duncker,
By his Attorneys.

(No Model.)
W. F. DUNCKER.
INTESTINE CLEANER.
No. 525,455.
2 Sheets—Sheet 2.
Patented Sept. 4, 1894.
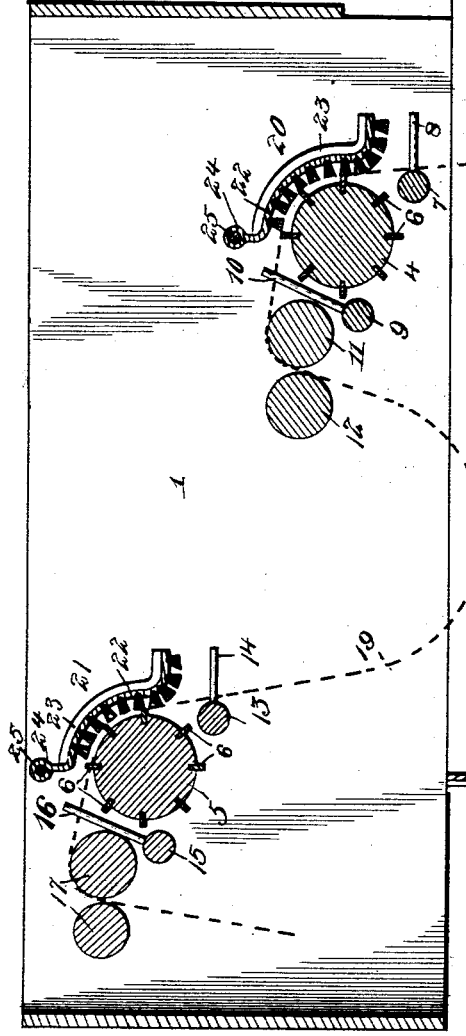
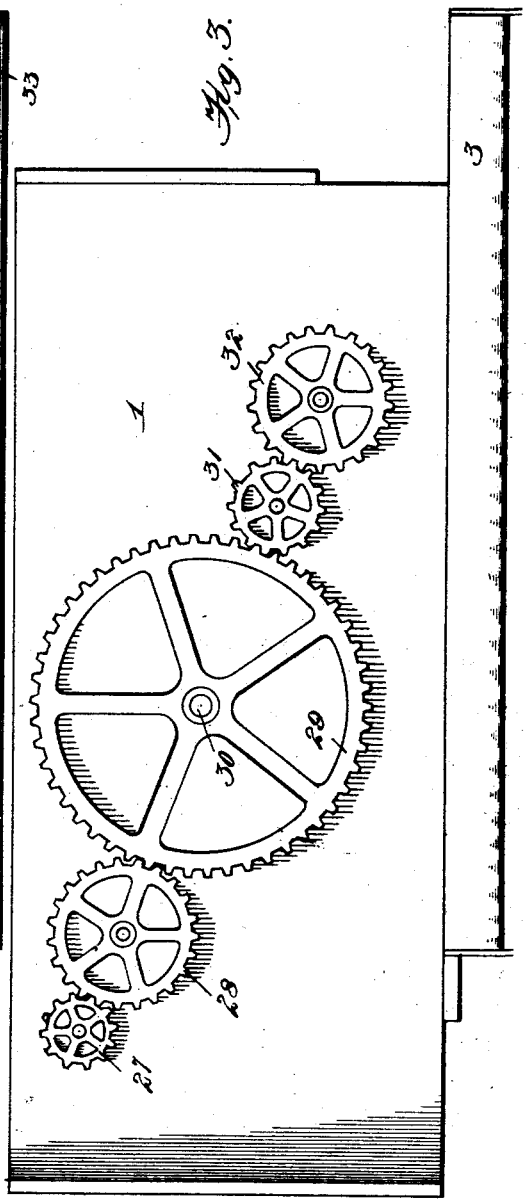
Witnesses
John C. Shaw
J. R. Owen
Inventor
William F. Duncker,
By his Attorneys.
C. A. Snow & Co.

UNITED STATES PATENT OFFICE.

WILLIAM F. DUNCKER, OF STEELTON, PENNSYLVANIA.

INTESTINE-CLEANER.

SPECIFICATION forming part of Letters Patent No. 525,455, dated September 4, 1894.

Application filed March 19, 1894. Serial No. 504,263. (No model.)

*To all whom it may concern:*

Be it known that I, WILLIAM F. DUNCKER, a citizen of the United States, residing at Steelton, in the county of Dauphin and State of Pennsylvania, have invented a new and useful Intestine-Cleaner, of which the following is a specification.

My invention relates to an improvement in those machines which are used for cleaning the interior of animal intestines, thus putting them in condition to receive sausage or other stuffing; and the principal object of the invention is to provide a machine which will more effectually clean the intestines and be less liable to tear or otherwise injure them. Other objects are contemplated, such as simplicity, cheapness and durability, and the full attainment of all will be apparent upon an understanding of the details of the invention.

In the accompanying drawings: Figure 1 represents a perspective view of my machine in use; Fig. 2, a longitudinal section of the same; Fig. 3, a side elevation showing the gearing for driving the parts; Fig. 4, a detail perspective of one of the cleaning brushes; Fig. 5, an enlarged perspective showing one of the scraping rolls and its co-operating parts.

The reference numeral 1 indicates the framework of my machine, which is rectangular in shape and may be formed of wood or metal as preferred, and is provided with the tank 3, which is arranged at the lower side thereof. The frame is provided with the two scraper rolls 4 and 5, each of which is journaled in the sides of the machine and extends transversely across it.

Secured to the periphery of the rolls 4 and 5, and extending longitudinally with the rolls and parallel with each other, are the scraping knives 6, which extend throughout the length of the rolls, and are about eight for each roll, though this, of course, may be varied. By means of these devices the scraping of the intestines is effected, as will better appear hereinafter. Located below the roll 4, and in the left-hand side thereof, is the transverse bar 7, which extends parallel with the rolls 4, and is secured rigidly in the sides of frame 1. Secured to this bar 7, and projecting out horizontally and rearwardly therefrom, are the fingers 8, which may be of any number, according to the number of intestines to be simultaneously cleaned, and between which the intestines are passed.

9 indicates a bar similar to the bar 7, and this bar is arranged forward of the roll 4, and on a plane nearly the same as that of the axis of the roll. This bar 9 is provided with the vertically-extending fingers 10, which project upwardly from the bar, and to a point some distance above the level of the roll 4. Located forward of the bar 9 are the feed-rollers 11 and 12, which are journaled in the sides of the frame 1, and in approximately the same horizontal line. These rolls engage each other and may be formed of rubber or other elastic material, which, however, is preferable though not essential.

The scraping roll 5 is located at the forward end of the frame 1, and near the upper edge thereof, and is attended by the bar 13, which is arranged at the lower rear side thereof, and parallel therewith and provided with the rearwardly and horizontally extending fingers 14, similar to fingers 8 of bar 7. In addition to the bar 13, the bar 15 is provided and arranged at the front of the roll 5, and in approximately the plane of its axis. This bar 15 is provided with the fingers 16, which extend vertically from it and to a point above the upper periphery of the roll 5. The feed-rolls for roll 5 are designated by the numeral 17, and are arranged parallel with each other and may also be formed of rubber, or the like. In use, the intestine, numbered 19, is passed from the rear end of tank 3 upwardly between two of the fingers 8, over the scraping roll 4, between the fingers 10, and thence between rolls 11 and 12. From here the intestine passes down into tank 3 and up over the roll 5, and between rolls 17, as will be more fully described hereinafter.

20 and 21 indicate two brushes, which are one for each scraping roll, and which are adapted to brush the upper sides of the intestines as they pass thereunder. These brushes consist of the metallic frame 22, provided with the longitudinally-extending bar 23, which is secured to its upper side and operates to weight the same, and with the upper ends 24, which are curved to embrace the transverse bars 25, secured, in turn, to the sides of the frame. The brushes proper, 20 and 21, are secured to the bent or curved portions of the frames 22, and are adapted to engage their respective rolls, and, of course, the intestines when moving thereover. Secured to the right-hand end of the rear roll 17 is the operating crank 26, which serves to give the said roll a rotary movement. This crank may be substituted by a drive-pulley, should power other than manual be employed. By this means the feed-rolls 17 are directly operated.

Fixed to the left-hand end of the rear roll 17, and outside the frame 1, is the pinion gear 27, which meshes with the spur-gear 28, of the scraping roll 5. This gear is also outside the frame 1, and meshes, in its turn, with the larger spur-gear 29, which operates on a short spindle or post 30, projecting out from the left-hand side of the frame. The gear 29 meshes with a pinion 31, and this pinion is fixed to the left-hand end of the feed roller 11, whereby motion is imparted to the feed-rolls 11 and 12.

From the pinion 31, motion is transmitted to the spur-gear 32, and this, in turn, is fixed to the left-hand end of the scraping roller 4, whereby said roller is driven. Thus it will be seen that the feed-rollers 17, scraper roll 5, feed-rolls 11 and 12, and the scraper roll 4 are all geared together, and operate in unison; and it is essential to the successful operation of the machine that the gears be so arranged that the feed-rolls 17 and 11 and 12 are driven at a uniform speed, thereby feeding the intestines regularly to each scraping roll. It is also essential that the scraping rolls revolve with a similar regularity, since it is not desirable for them to revolve at different speeds, as this would be apt to tear the intestines.

To use the machine for cleaning hog and all intestines other than beef intestines, the intestines are first placed in the rear end of the tank 3, with their usual contents in them, and then passed up through the rolls and scrapers, as before explained. The crank 26 is then operated to revolve the feed and scraper rolls, and the gearing is so disposed that the rolls 4 and 5 will be revolved rearwardly, in a direction opposite to the line of movement of the intestines. As the machine operates, the intestine is allowed to be slack enough between the two scraping rolls, so that it will pass through the water in the upper end of the tank 3 before going to roll 5. Thus the scraper knives of the rolls 4 and 5 operate in conjunction with the weighted brushes 20 and 21 to press the contents of the intestines rearwardly, and so it is forced out the rear end of the intestine. The tank 3 is filled with water, and this is kept warm by means of the heating apparatus 33, arranged under the tank. The purpose of this is to keep the intestines soft during the cleaning operation.

If beef intestines are to be cleaned it will be necessary to turn them inside out before putting them through the machine; this, however, is well known and does not require further description.

It will be understood that the purpose of the brushes 20 and 21 is not so much to brush the intestines as to press them against the rolls 4 and 5, and to cushion them in so doing. It will be understood that my machine is capable of cleaning any number of intestines at once, for by widening the sides of the frame 1 the length of the rolls, and consequently the capacity of the machine, may be increased.

Having described my invention, what I claim is—

1. An intestine cleaner comprising the combination of a scraping roll over which the intestines are to be passed, means for revolving the roll and for drawing the intestines thereover, a plate pivotally mounted adjacent to the roll and weighted so as to be yieldingly held against it, and a cushion on that side of the plate which engages the roll, the plate being adapted to press the intestines against the roll, substantially as described.

2. An intestine cleaner comprising the combination of a scraping roll adapted to have the intestines passed over it, means for revolving the roll and for drawing the intestines thereover, a plate yieldingly held against the roll, a cushioning brush fixed to the side of the plate which engages the roll, and two series of parallel guide-fingers arranged one on each side of the roll and adapted to guide the intestines in their passage to and from the same, substantially as described.

3. An intestine cleaner, comprising the combination of a water tank, a scraping roll on opposite sides thereof, and feed-rolls operating with each of the scraping rolls, whereby the intestines are drawn over one scraper and allowed to pass through the water of the tank and then drawn over the remaining scraper, substantially as described.

In testimony that I claim the foregoing as my own I have hereto affixed my signature in the presence of two witnesses.

WM. F. DUNCKER.

Witnesses:
   JOHN H. SIGGERS,
   GEO. C. SHOEMAKER.